(12) United States Patent
Dufresne et al.

(10) Patent No.: US 10,390,503 B2
(45) Date of Patent: Aug. 27, 2019

(54) AUTOMATED MOBILE TERRACE GROWING SYSTEM

(71) Applicants: Stephen A. Dufresne, Calgary (CA); Isaac Van Geest, Bergschenhoek (NL)

(72) Inventors: Stephen A. Dufresne, Calgary (CA); Isaac Van Geest, Bergschenhoek (NL)

(*) Notice: Subject to any disclaimer, the term of this patent is extended or adjusted under 35 U.S.C. 154(b) by 202 days.

(21) Appl. No.: 15/230,527

(22) Filed: Aug. 8, 2016

(65) Prior Publication Data

US 2017/0202162 A1 Jul. 20, 2017

Related U.S. Application Data

(63) Continuation-in-part of application No. 15/001,648, filed on Jan. 20, 2016, and a continuation-in-part of application No. 15/205,738, filed on Jul. 8, 2016.

(51) Int. Cl.
*A01G 31/04* (2006.01)
*A01G 31/06* (2006.01)
*A01G 31/00* (2018.01)

(52) U.S. Cl.
CPC .......... *A01G 31/042* (2013.01); *A01G 31/06* (2013.01); *A01G 2031/006* (2013.01); *Y02P 60/216* (2015.11)

(58) Field of Classification Search
CPC . A01G 9/12; A01G 9/20; A01G 9/246; A01G 9/247; A01G 2031/006; A01G 31/04; A01G 31/042; A01G 31/045; A01G 31/06
USPC ................................................. 47/62 A, 901
See application file for complete search history.

(56) References Cited

U.S. PATENT DOCUMENTS

| | | | | |
|---|---|---|---|---|
| 108,046 A | * | 10/1870 | Palmenberg | D06F 57/04 211/173 |
| 1,217,239 A | * | 2/1917 | Swartz | A01G 9/1423 261/DIG. 11 |
| 2,586,264 A | * | 2/1952 | Rose | B61B 10/025 104/91 |
| 3,292,305 A | * | 12/1966 | Stengel | A01G 18/60 47/1.1 |
| 3,327,425 A | * | 6/1967 | Miroslav | A01G 31/045 47/60 |
| 3,771,258 A | * | 11/1973 | Charney | A01G 31/042 47/65 |

(Continued)

*Primary Examiner* — Joshua D Huson
*Assistant Examiner* — Brady W Frazier
(74) *Attorney, Agent, or Firm* — Dunlap Bennett & Ludwig PLLC

(57) ABSTRACT

A closed loop system for growing vegetation is provided. The closed loop system includes at least a first transport conveyor and a second transport conveyor. Each of the first and second transport conveyors includes a front end opposite a rear end. The present invention further includes at least a first transfer conveyor. A lighting system is positioned to emit light towards the first transport conveyor and a second transport conveyor. The present invention further includes at least one terrace structure. The first transport conveyor transports at least one terrace structure from the front end to the rear end, the first transfer conveyor transfers the at least one terrace structure from rear end of the first transport conveyor to the front end of the second transport conveyor and the second transport conveyor transports the at least one terrace structure from the front end to the rear end.

19 Claims, 10 Drawing Sheets

(56) References Cited

U.S. PATENT DOCUMENTS

| | | | | |
|---|---|---|---|---|
| 4,028,847 A * | 6/1977 | Davis | A01G 31/042 | 165/59 |
| 4,059,922 A * | 11/1977 | DiGiacinto | A01G 31/06 | 47/59 R |
| 4,068,405 A * | 1/1978 | Campbell | A01G 31/045 | 47/65 |
| 4,072,111 A * | 2/1978 | Hoehn | B61B 10/025 | 104/172.4 |
| 4,074,538 A * | 2/1978 | Janus | E01F 8/021 | 256/12.5 |
| 4,075,785 A * | 2/1978 | Jones | A01G 31/06 | 47/64 |
| 4,163,342 A * | 8/1979 | Fogg | A01G 7/045 | 47/58.1 R |
| 4,218,847 A * | 8/1980 | Leroux | A01G 31/06 | 47/59 R |
| 4,292,762 A * | 10/1981 | Fogg | A01G 9/246 | 47/17 |
| 4,337,986 A * | 7/1982 | Haub | F16C 13/04 | 384/428 |
| 4,476,651 A * | 10/1984 | Drury | A01G 31/042 | 47/65 |
| 4,514,930 A * | 5/1985 | Schorr | A01G 31/02 | 47/60 |
| 4,704,818 A * | 11/1987 | Cameron | A01G 9/022 | 47/48.5 |
| 4,869,019 A * | 9/1989 | Ehrlich | A01G 31/06 | 47/59 R |
| 4,899,487 A * | 2/1990 | Brownlee | A47F 7/0071 | 47/41.01 |
| 4,965,962 A * | 10/1990 | Akagi | A01G 31/06 | 47/62 A |
| 5,095,653 A * | 3/1992 | Guldberg | A01G 9/023 | 206/423 |
| 5,252,108 A * | 10/1993 | Banks | A01G 9/143 | 47/58.1 R |
| 5,265,376 A * | 11/1993 | Less | A01G 9/022 | 47/83 |
| 5,484,234 A * | 1/1996 | Worden | E01F 8/021 | 405/284 |
| 5,502,923 A * | 4/1996 | Bradshaw | A01G 31/06 | 47/62 A |
| 6,000,173 A * | 12/1999 | Schow | A01G 31/02 | 47/59 R |
| 6,021,602 A * | 2/2000 | Orsi | A01G 31/02 | 47/62 A |
| 6,615,542 B2 * | 9/2003 | Ware | A01G 31/02 | 47/83 |
| 7,080,482 B1 * | 7/2006 | Bradley | A01G 31/02 | 47/60 |
| 7,827,733 B2 * | 11/2010 | DiMaggio | A47G 7/041 | 47/39 |
| 7,886,482 B2 * | 2/2011 | DiMaggio | A47G 7/041 | 47/39 |
| 9,591,814 B2 * | 3/2017 | Collins | A01G 31/02 | |
| 2004/0163308 A1 * | 8/2004 | Uchiyama | A01G 7/045 | 47/1.01 R |
| 2004/0237386 A1 * | 12/2004 | Madsen | A01G 7/02 | 47/1.01 P |
| 2006/0162252 A1 * | 7/2006 | Lim | A01G 31/045 | 47/59 R |
| 2006/0201058 A1 * | 9/2006 | Ripatti | A01G 31/042 | 47/1.1 |
| 2011/0061296 A1 * | 3/2011 | Simmons | A01G 31/02 | 47/62 A |
| 2012/0227322 A1 * | 9/2012 | Belmote | A01G 31/042 | 47/62 A |
| 2012/0297678 A1 * | 11/2012 | Luebbers | A01G 31/02 | 47/62 A |
| 2013/0019527 A1 * | 1/2013 | Howe-Sylvain | A01G 31/06 | 47/62 A |
| 2013/0305601 A1 * | 11/2013 | Park | A01G 31/04 | 47/17 |
| 2014/0190078 A1 * | 7/2014 | Kim | A01G 31/02 | 47/62 A |
| 2015/0014440 A1 * | 1/2015 | Nagadome | A01G 9/247 | 239/289 |
| 2015/0250115 A1 * | 9/2015 | Pickell | A01G 31/042 | 47/62 R |
| 2015/0305260 A1 * | 10/2015 | Ng | A01G 31/042 | 47/62 R |
| 2016/0000019 A1 * | 1/2016 | Koerner | F21V 23/02 | 47/58.1 LS |
| 2016/0021838 A1 * | 1/2016 | Cheng | A01G 31/02 | 47/62 R |
| 2016/0106048 A1 * | 4/2016 | Moghaddam | A01G 31/042 | 47/62 R |
| 2016/0165810 A1 * | 6/2016 | Johansson | A01G 31/042 | 47/65 |
| 2016/0183486 A1 * | 6/2016 | Kabakov | A01G 31/02 | 47/62 R |
| 2016/0324089 A1 * | 11/2016 | Miyabe | A01G 31/06 | |

* cited by examiner

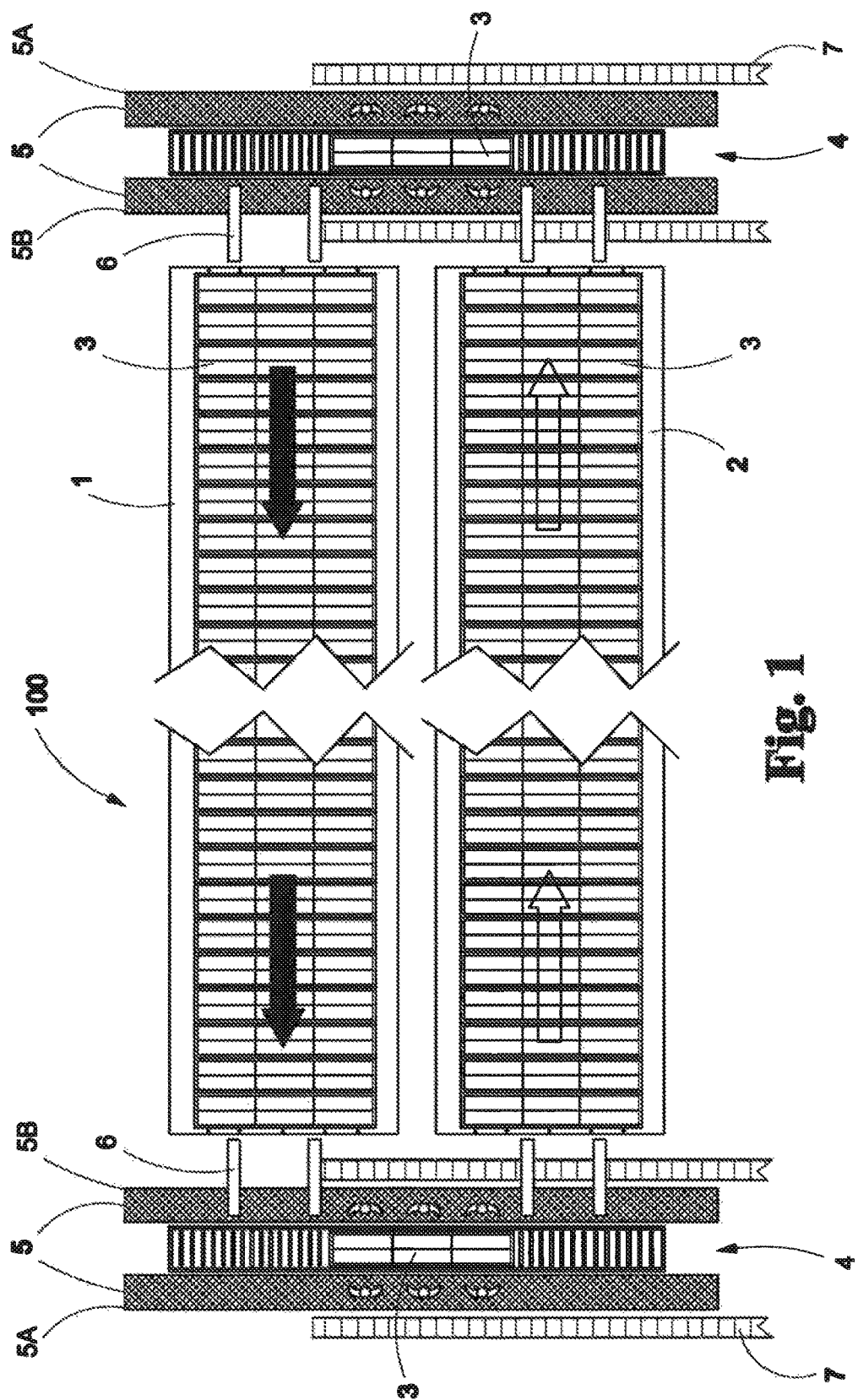

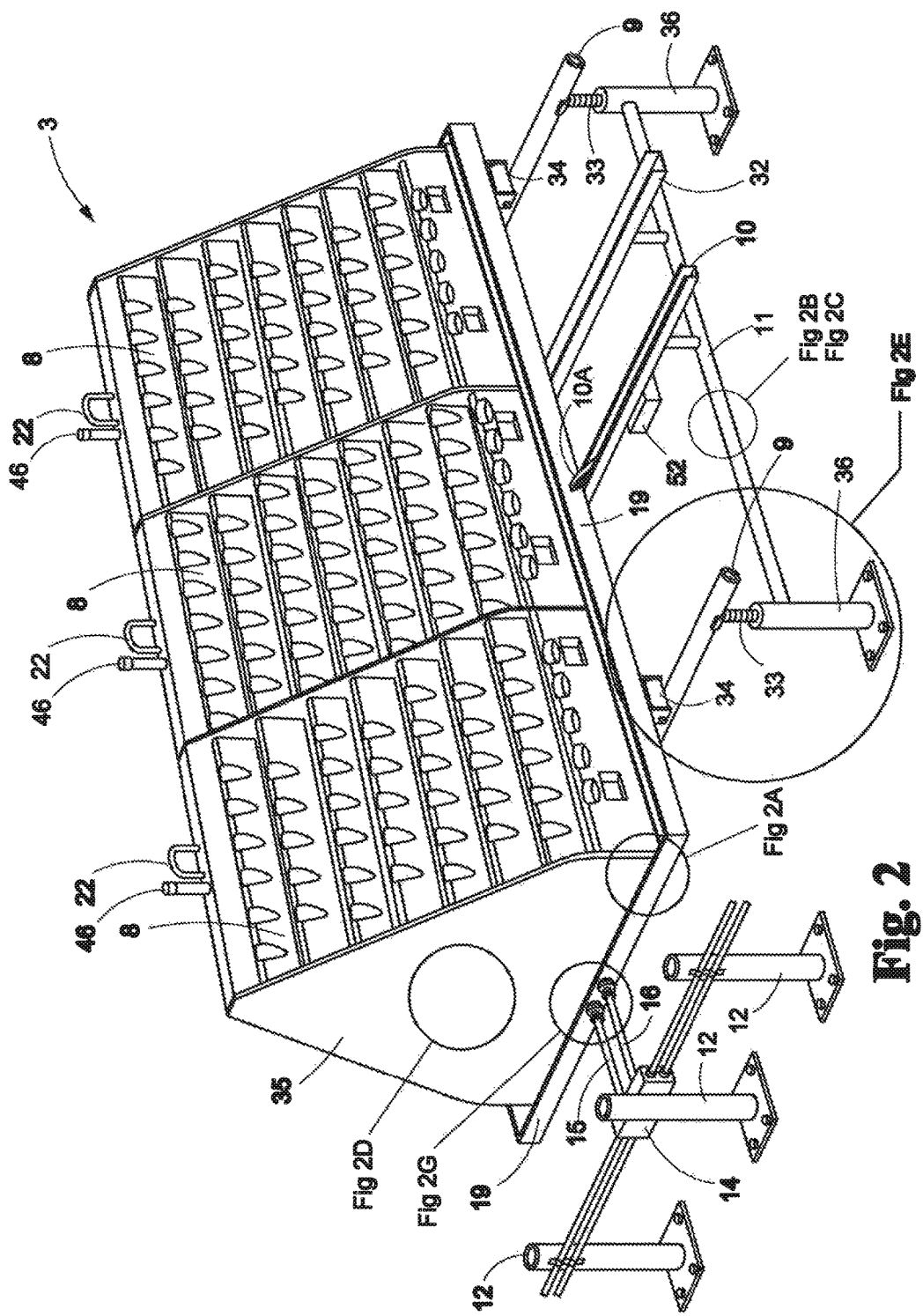

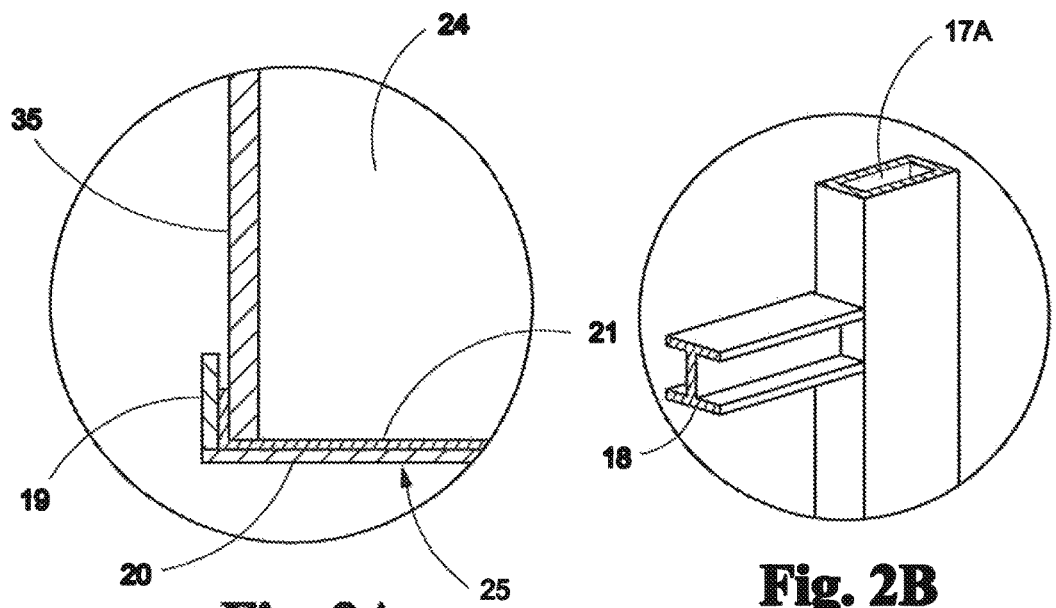
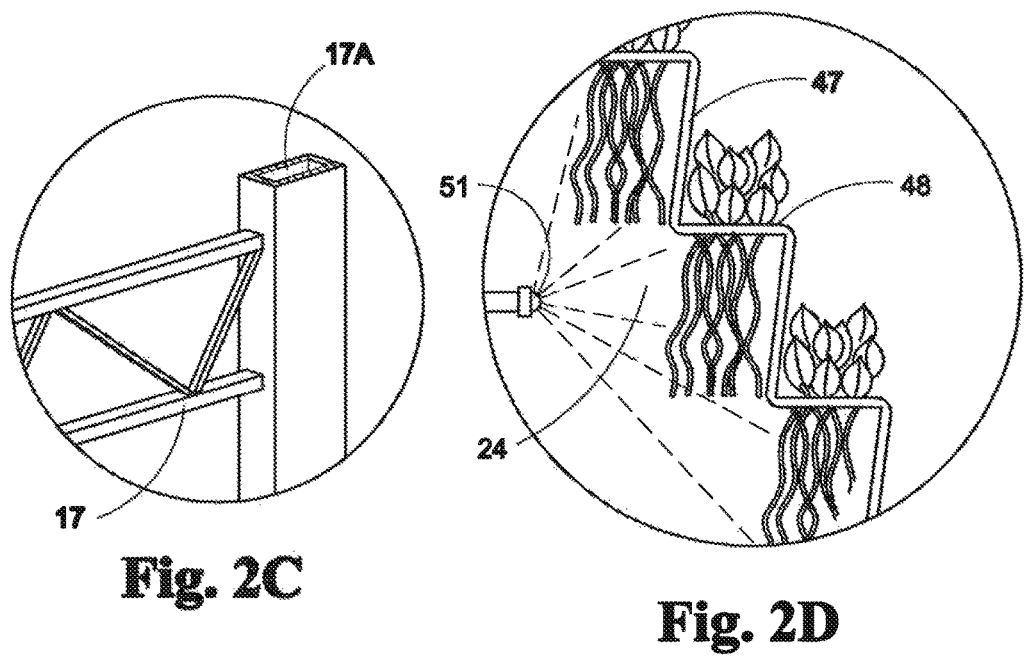

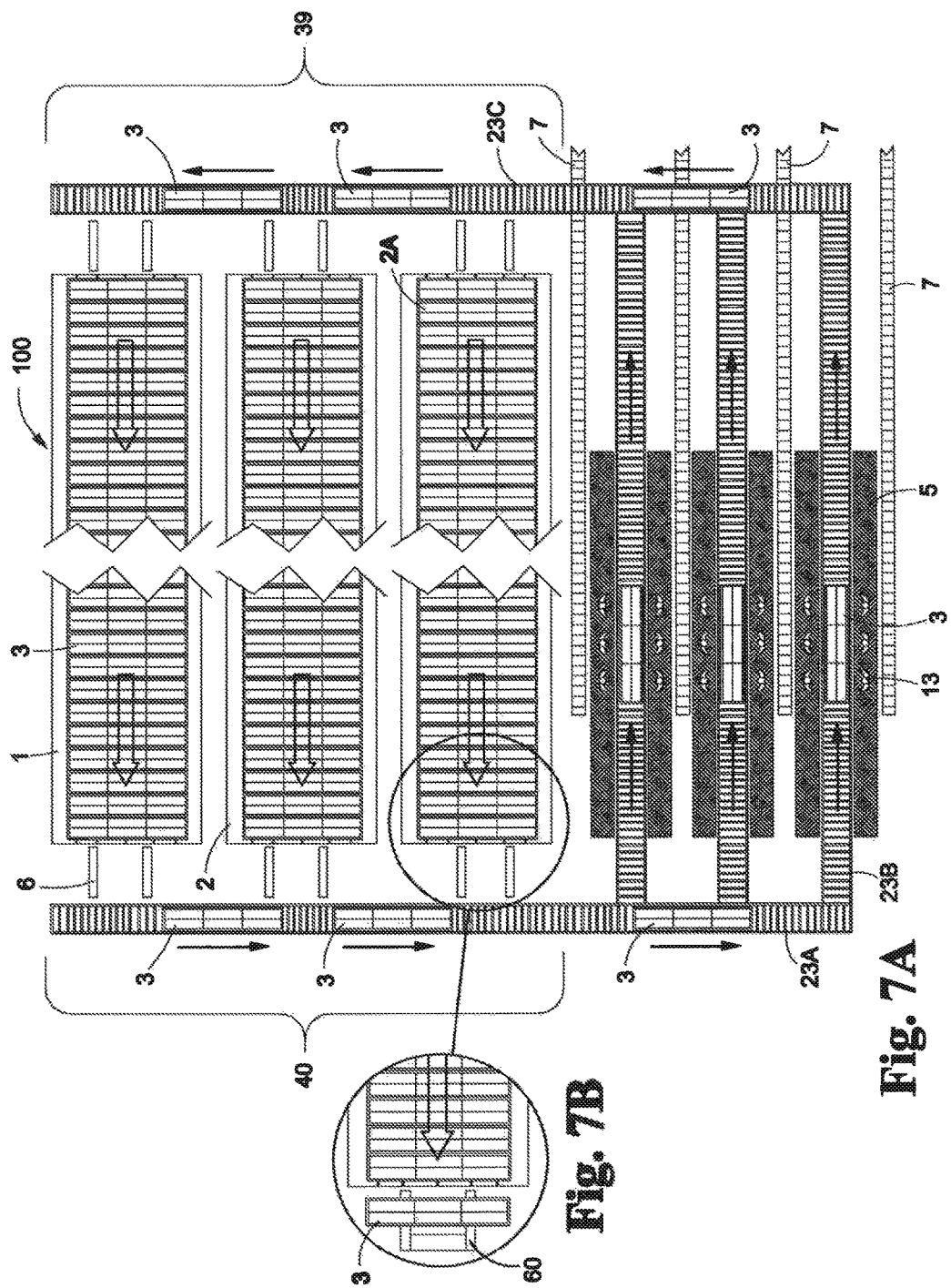

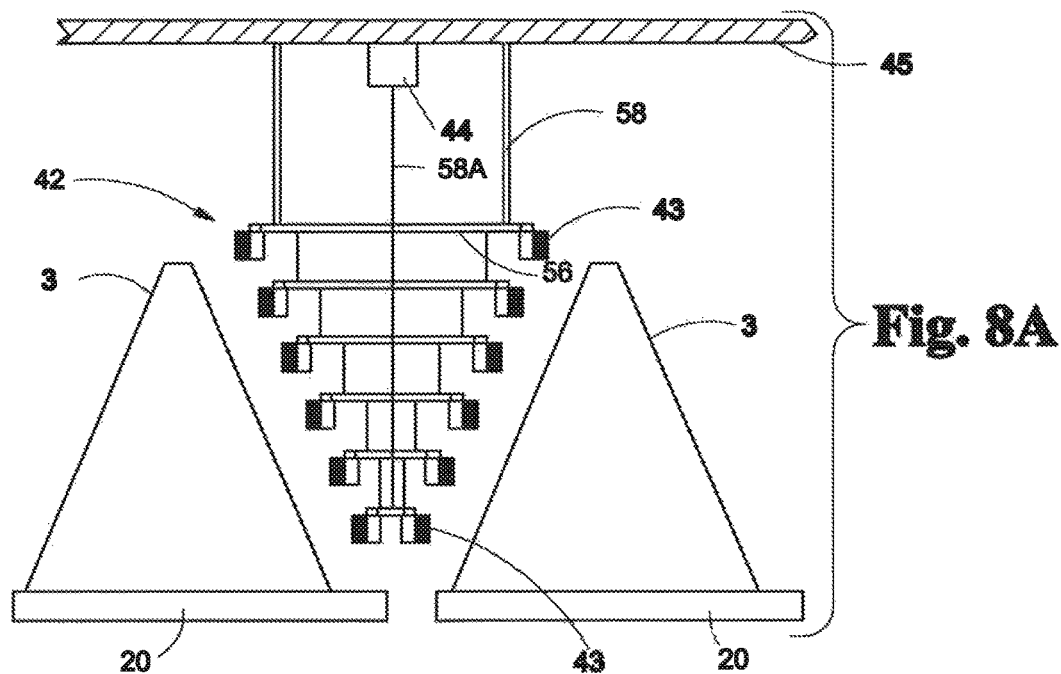
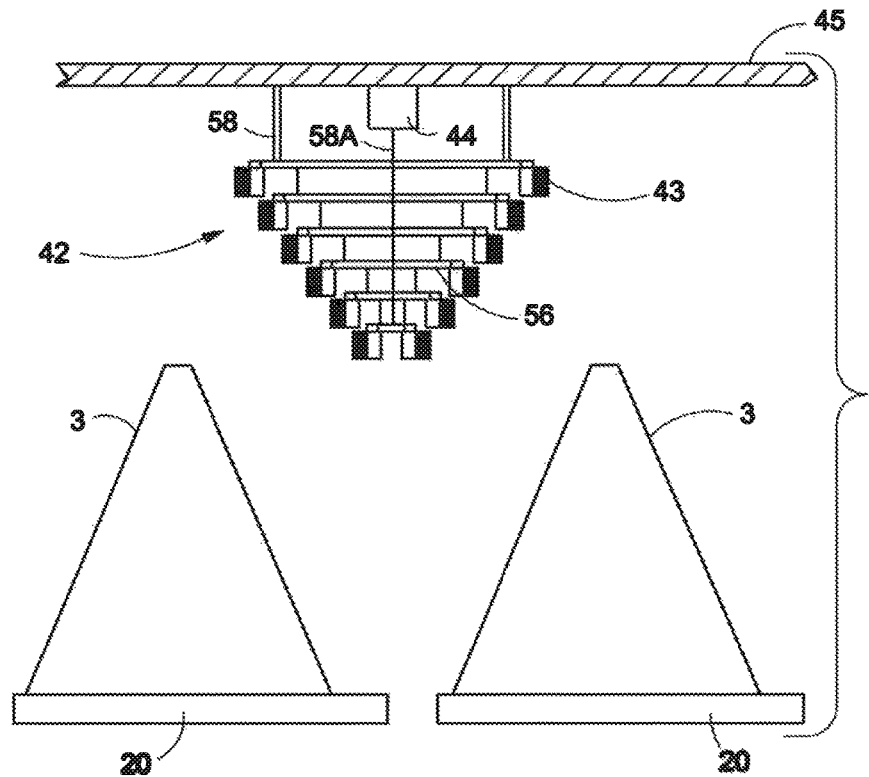

US 10,390,503 B2

AUTOMATED MOBILE TERRACE GROWING SYSTEM

CROSS-REFERENCE TO RELATED APPLICATION

This application is a continuation-in-part to U.S. non-provisional application Ser. No. 15/001,648, filed Jan. 20, 2016, and U.S. non-provisional application Ser. No. 15/205,738, filed Jul. 8, 2016, the contents of which are herein incorporated by reference.

BACKGROUND OF THE INVENTION

The present invention relates to indoor growing systems and, more particularly, to an automated mobile terrace growing system for growing high density vegetation indoors in a controlled environment.

A grow room is a room of any size where plants are grown under controlled environmental conditions. Plants are grown with the use of artificial light. The plants in a grow room can be grown in soil, or without soil via means of aeroponic and or hydroponic technology. Utilizing a building as a grow room either next to or in dense population areas is very desirable in order to provide fresh quality vegetation with higher levels of nutrition while substantially reducing your carbon foot print.

As can be seen, there is a need for improved and efficient systems for growing vegetation within indoor grow rooms where space allocation efficiency important to maximizing high density growing.

SUMMARY OF THE INVENTION

In one aspect of the present invention, a mobile terrace growing system comprises: a first transport conveyor comprising a front end and a rear end; a second transport conveyor comprising a front end and a rear end; a first transfer conveyor; a plurality of lights positioned to emit light towards the first transport conveyor and the second transport conveyor; and at least one terrace structure comprising: a bottom portion configured to support the terrace structure in an upright position; and at least one growing panel extending from the bottom portion and comprising an outer surface and an inner surface, wherein the outer surface comprises a plurality of adjoining risers and terrace levels, wherein a plurality of openings are formed through the terrace levels and a substantially enclosed space is formed within the terrace structure, wherein the first transport conveyor transports the at least one terrace structure from the front end to the rear end, the first transfer conveyor transfers the at least one terrace structure from the rear end of the first transport conveyor to the front end of the second transport conveyor, and the second transport conveyor transports the at least one terrace structure from the front end to the rear end.

These and other features, aspects and advantages of the present invention will become better understood with reference to the following drawings, description and claims.

BRIEF DESCRIPTION OF THE DRAWINGS

FIG. 1 is a top view of an embodiment of a closed loop system of the present invention;

FIG. 2 is a perspective view of an embodiment of a terrace structure on a transport conveyor of the present invention;

FIG. 2A is a section detail view of the terrace structure of FIG. 2 illustrating a table and a catch pan;

FIG. 2B is an alternate embodiment of the connector brackets of FIG. 2;

FIG. 2C is an alternate embodiment of the connector brackets of FIG. 2;

FIG. 2D is a section detail view of a growing panel of FIG. 2;

FIG. 7A is a top view of an embodiment of the closed loop system of the present invention;

FIG. 7B is a section detail view of a multiple closed loop system of the present invention;

FIG. 8A is a side view of an embodiment of a lighting system in an deployed position;

FIG. 8B is a side view of an embodiment of the lighting system in an retracted position.

DETAILED DESCRIPTION OF THE INVENTION

Figure 2E:
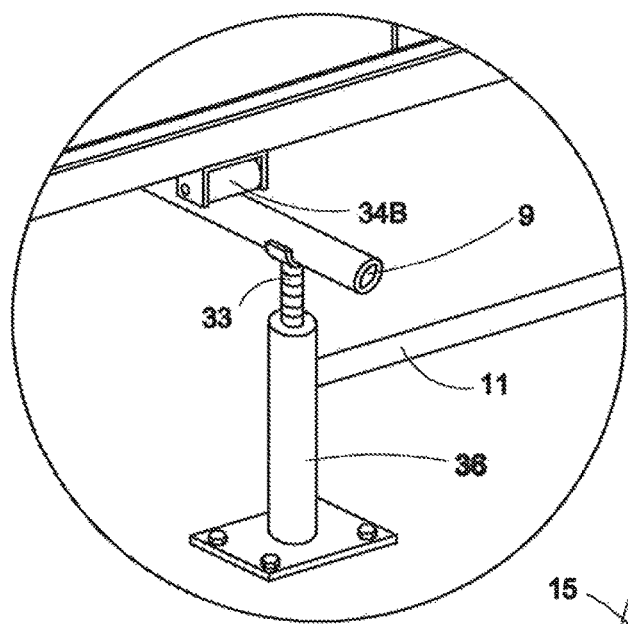
FIG. 2E is a section detail view of a base of the transport conveyor of FIG. 2.
Figure 2G:
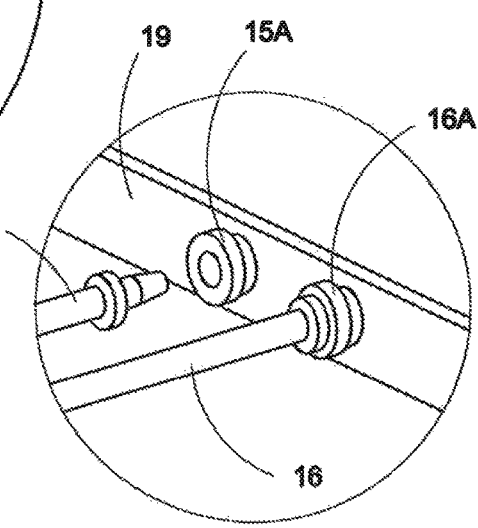
FIG. 2G is a section detail view of the air and water delivery system of FIG. 2.
Figure 2F:
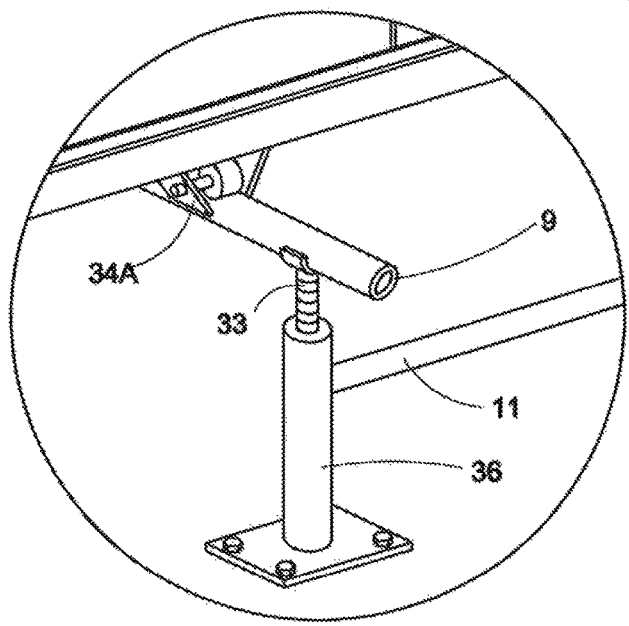
FIG. 2F is a section detail view of the base of the transport conveyor.
Figure 3:
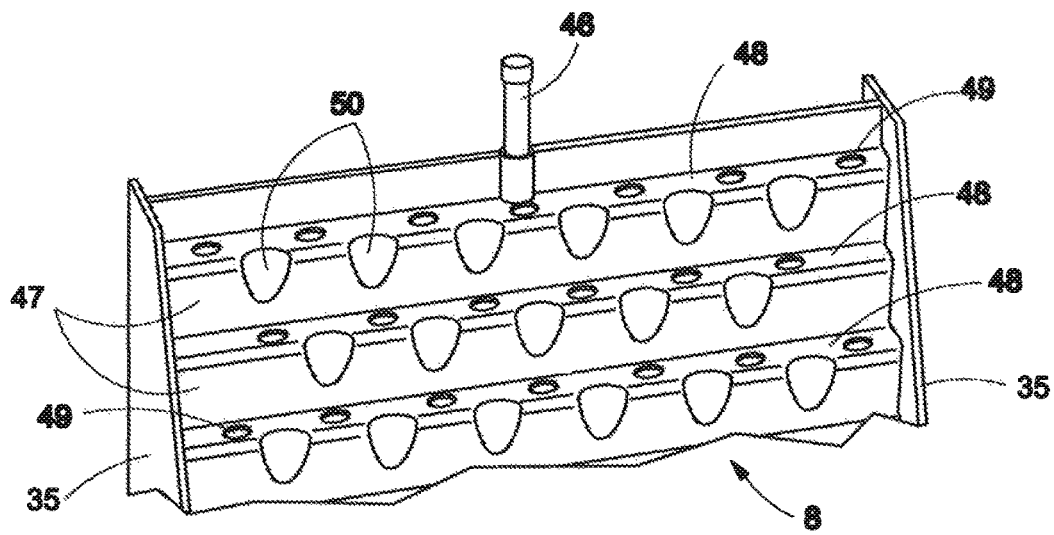
FIG. 3 is a section detail view of an embodiment of a growing panel of the terrace structure.
Figure 4:
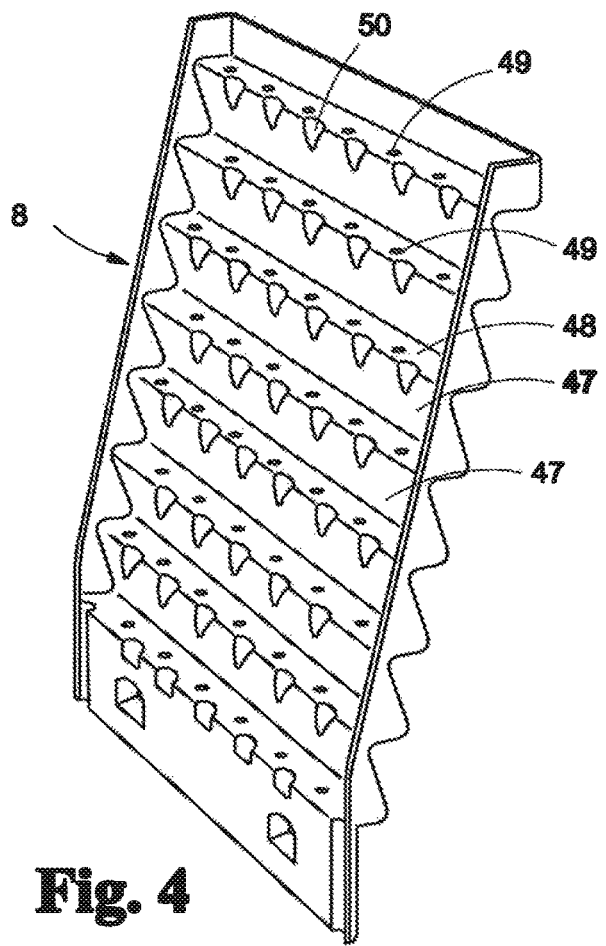
FIG. 4 is a front perspective view of an embodiment of the growing panel of the terrace structure.
Figure 5:
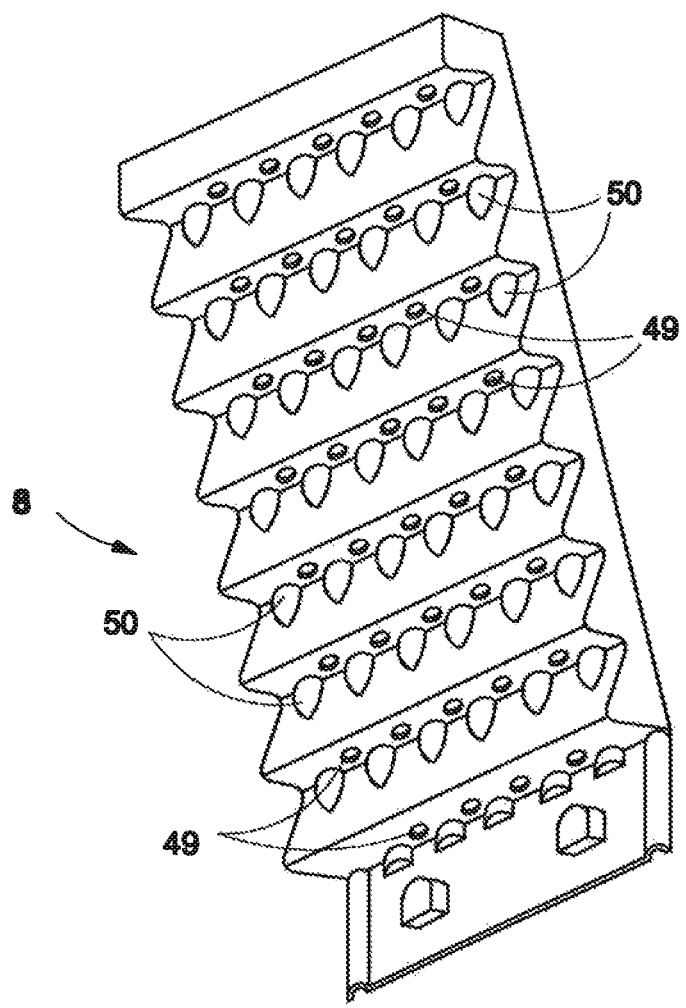
FIG. 5 is a rear perspective view of an embodiment of the growing panel of the terrace structure.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an automated mobile terrace growing system in a closed loop system having either an aeroponic or hydroponic watering system, with mobile tables each containing terrace structures. The mobile tables are transferred and transported by multiple conveyors structures for the production of high density fresh vegetation grown in a controlled indoor environment. The terrace structures support plants and allow for an aeroponic or hydroponic watering system to irrigate the roots in a confined growth chamber. Further the present invention facilitates the planting, harvesting and servicing of vegetation from docking stations at the front and rear ends of the conveyor systems or to a central docking station in a growing room without the need for ladders and stairs.

The present invention is extremely useful in that it utilizes a standard building located anywhere such as next to the local urban population it is servicing i.e. in the cities. The present invention converts buildings into a large environmentally controlled growth chamber that can house multiple growing conveyor systems, with multiple terrace structures and docking stations. Each of the terrace structures are capable of growing large volumes of vegetation in a small space and facilitating the local delivery of fresh vine ripped nutritious vegetation with a very small carbon foot print.

In addition to the above mentioned benefits, the present invention provides for maximum Leaf Area Index (LAI) while providing for maximum number of plants per square foot per level. Simply the present invention brings the terrace structures to the robots and people rather than the robots and people going to the terrace structures, thus eliminating the need for all the walkway rows normally required for accessing the otherwise stationary terrace gardens.

The terrace structure of the present invention includes a confined growth chamber allowing the plant to flourish on the outside with light and enriched $CO_2$ air for the photosynthesis process. The terrace structure includes a dark environment within for the roots to absorb the enriched oxygen nutrient fertilizer while being protected from light and the enriched $CO_2$ air which can be harmful to the roots.

Referring to FIGS. 1 through 9, the present invention includes a closed loop system 100 for growing vegetation. The closed loop system 100 includes at least a first transport conveyor 1 and a second transport conveyor 2. Each of the first and second transport conveyors 1, 2 include a front end opposite a rear end. The present invention further includes at least a first transfer conveyor 23. A lighting system 42 is positioned to emit light towards the first transport conveyor 1 and a second transport conveyor 2. The present invention further includes at least one terrace structure 3. The first transport conveyor 1 transports at least one terrace structure 3 from the front end to the rear end, the first transfer conveyor 23 transfers the at least one terrace structure 3 from rear end of the first transport conveyor 1 to the front end of the second transport conveyor 2 and the second transport conveyor 2 transports the at least one terrace structure 3 from the front end to the rear end.

Each of the terrace structures 3 include a bottom portion 25 and at least one growing panel 8. The bottom portion 25 is configured to support the terrace structure 3 in an upright position. The growing panel 8 extends from the bottom portion 25 at an angle. The angle between the growing panel 8 and the bottom portion may be from about 0 up to about 90 degrees, from about 45 degrees up to about 75 degrees, such as about 60 degrees. The growing panel 8 includes an inner surface and an outer surface. The outer surface includes a plurality of adjoining risers 47 and terrace levels 48 forming a stair like structure. A plurality of openings 49 are formed through each of the terrace levels 48. A plant may fit within an opening 49 such that the foliage is protruding from the outer surface and the roots are protruding from the inner surface. A substantially enclosed space 24 is formed in between the bottom portion 25 and the growing panel 8, thereby enclosing the roots. The lighting system 42 may be positioned to emit light towards the outer surface of at least one growing panel 8 and on the plants.

In certain embodiments, the bottom portion 25 of the terrace structure 3 may include a catch pan 21 with a drain. The catch pan 21 includes an inner surface within the enclosed space. The inner surface tapers towards the drain forming a funnel. The catch pan 21 is placed under the growing panels 8 and end panels 35 to recover the excess nutrient mist. The drain delivers the excess nutrient mist to a water recovery gutter 32 of the transport conveyors 1, 2 to be recycled back to a closed loop irrigation system. The catch pans 21 of the present invention may be made of a polymer such as, but not limited to, thermoform, prime Acrylonitrile-Butadiene-Styrene (ABS), high molecular weight polyethylene, Amorphous thermoplastic material, and the like.

The terrace structures 3 of the present invention may be made of a polymer such as, but not limited to, thermoform, prime Acrylonitrile-Butadiene-Styrene (ABS), high molecular weight polyethylene, Amorphous thermoplastic material, and the like in a variety of colors. Each terrace structure 3 may include a hoist hook 22 so that when the terrace structure 3 is scheduled for servicing, a hoist may lift the terrace structure 3 up from the table 20 so that the catch pan 21 and the aeroponic or hydroponic watering system is easily accessed and cleaned. Each terrace structure 3 may have at least one plant up to one hundred eighty-four plants.

In certain embodiments, the terrace structures 3 of the present invention may include more than one growing panel 8. For example, the present invention may include a first growing panel 8 and a second growing panel 8 extending from opposing sides of the bottom portion 25 and angled towards one another, forming a triangle shaped structure. In certain embodiments, the present invention may include a top portion or cover that adjoins the top ends of each of the panels 8 together. The shape of the present invention protects the plant foliage from being drenched while allowing the plant's roots to be irrigated aeroponically. The terrace levels 48 allow each plant the maximum LAI for the greatest exposure to light. The enclosed space 24 keeps out the enriched $CO_2$ air from exposure to the roots and shields the roots from the light.

In certain embodiments, each of the growing panels 8 may include a plurality of indents 50 forming convex protrusions on the inner surface. The indents 50 may be formed in between each of the openings 49 and may be formed where the plurality of risers 47 and the plurality of terraces 48 meet. The convex protrusions formed by the indents 50 are rounded and form reflective walls on both sides of the plant's roots, and thereby help deflect water onto the roots from all sides. A mister 51 disposed within the enclosed space 24 emits a mist that hits the rounded wall and bounces back onto the roots which helps ensure that all sides of the root receive a nutrient mist. The indents 50 further form concave recesses on the outer surface of the growing panels 8. The indents 50 may be formed on the risers 47 just above each of the plant openings 49 on the outer surface. The indents 50 add to the structural strength of growing panels 8.

In certain embodiments, each riser 47 is recessed at its base and angled away from a central vertical axis of the terrace structure 3. The angle between the riser 47 and the terrace level 48 may be from about 45 degrees up to about 80 degrees, such as about 60 degrees. The angle of the risers 47 forces the plant to grow slightly outward from the growing panel 8. Therefore, the vegetation hangs freely over the edge of each terrace level 48 for ease of harvesting.

The terrace structure 3 of the present invention may further include end panels 35. The end panels 35 may include a first end panel 35 and a second end panel 35 extending from the bottom portion 25 on opposing sides. The end panels 35 each adjoin the first growing panel 8 and the second growing panel 8 together to further strengthen the terrace structure 3. The enclosed space 24 is formed in between the end panels 35, the bottom portion 25, and the growing panels 8. The end panels 35 structurally hold the growing panels 8 together and contain the mist inside of the terrace structures 3, preventing $CO_2$ and light from entering the enclosed space 24.

In certain embodiments, the present invention may utilize a plurality of tables 20. Each table 20 may include a protruding sidewall 19 disposed about the perimeter to contain terrace structures 3 in between. As illustrated in the Figures, a plurality of tables 20 may run through the transport conveyors 1, 2, where each of the tables 20 includes a plurality of terrace structures. The table 20 may be made of aluminum, stainless steel or other suitable materials. The bottom of the table 20 may be a wire mesh material or a series of pipes or bars to support the terrace structure 3 and the catch pan 21. The table sidewalls 19 may be from about 2 inches to 8 inches high. The tables 20 may vary from about 3 feet to about 12 feet by about 5 feet to about 22 feet.

The present invention may include an air and water delivery system operable to deliver air and water to the enclosed space 24 of the terrace structures 3. In such embodiments, the present invention may include a hydraulic arm box 14 having an extendable air injection arm 15 and an extendable water injection arm 16. The hydraulic arm box 14 may be supported by vertical pipe posts 12 disposed alongside each of the transport conveyors 1, 2. Alternatively, the hydraulic arm box 14 may be disposed underneath the transport conveyors 1, 2. A water inlet 16a and an air inlet 15a leading into the enclosed space 24 may be disposed on either the side or the bottom of the terrace structures 3 and/or tables 20. The extendable air injection arm 15 and the water injection arm 16 may extend into the air inlet 15a and water inlet 16a respectively from either the side or below the terrace structures 3 and deliver air and water into the terrace structures 3. The mister 51 is disposed within the substantially enclosed space 24 and connected to the water inlet 15a. The mister 51 directs mist towards the roots of the plant. The mister 51 projects a mist of water molecules (droplets) that are propelled through the air absorbing fresh oxygen on their way to the roots thus delivering an enriched oxygen nutrient spray to the bare roots, better known as aeroponic misting.

The terrace structure 3 may further include an exhaust chimney 46. The exhaust chimney 46 allows for the warm older stale air to escape when new cooler fresh air is injected into the enclosed space 24 forcing the warmer stale air out of the terrace structure 3. The chimney 46 may further include a damper or cover that closes when the extendable air injection arm 15 stops injecting air into the root growing area. This would ensure that no CO2 would enter the enclosed space 24.

The lighting system 42 of the present invention may be secured to the ceiling 45 of a building above the first and second transport conveyors 1, 2 and emit light onto the growing panels 8. For example, the lighting system 42 may hang from safety cables 58. A plurality of support bars 56 hang from the safety cables 58 at equal distances relative to one another. The support bars 56 may be substantially horizontal. The support bars 56 may be made of a metal rod, metal tubing, plastic piping, and the like. The safety cables 58 may be made of steel cable, copper wire, nylon rope, cloth rope or the like. The support bars 56 may have different lengths, the longest support bar 56 being at the top and the shortest support bar 56 being at the bottom. The lights 43 are attached to each end of the support bars 56. The lights 43 of the present invention may include, but are not limited to, incandescent lights, fluorescent lights, high pressure sodium lights (HSP), metal, haloid lights (MH), light emitting diodes (LEDs) and the like. The lighting system 42 may be positioned so that the lights 43 are positioned parallel the growing panels 14 and spaced vertically to be equidistant from the top to the bottom of the plant canopy of the growing panels 8 to provide an even light pattern over the whole terrace structure 3.

In certain embodiments, the lighting system 42 may be retractable. A hoist 44 raises the lighting system 42 by retracting a hoist cable 58A. The lights 43 may thereby rise to allow the terrace structures 3 to continue to move down the transport conveyors 1, 2. When the terrace structures 3 stop on the transport conveyors 1, 2, the hoist 44 lowers the bars 56 by releasing the hoist cable 58A to their pre-designated location and the lights 43 resume illumination of the plant canopy.

As the lighting system 42 is raised and lowered to allow the terrace structures 3 to transport down the transport conveyors 1, 2, the hydraulic arm box 14 retracts and disconnects the air injection arm 15 and the extendable water injection arm 16 from the water inlet 16a and the air inlet 15a, suspending the water supply to the aeroponic or hydroponics water system and suspending the air exchange process to the enclosed space 24. Once the terrace structures 3 stop transporting for the day, the hydraulic arm box 14 extends the air injection arm 15 and the extendable water injection arm 16 back to restore the air flow and water supply to the enclosed space 24.

As mentioned above, the first and second transport conveyors 1, 2 transport the terrace structures 3 from the first end to the second end. The first and second transport conveyors 1, 2 may each include at least one transport track 10. The transport track 10 includes an upper channel running from a front end to a rear end. A chain 10b runs within the transport track 10. A plurality of clackers 10a may be secured to the chain 10b so that at least a tip of each of the clackers 10a protrudes beyond the upper channel of the transport track 10. A motorized actuator 52 may be used to move the chain 10b in the transfer track 10. The actuator 52 drives the chain 10b and the clackers 10a catch the tables 20 and/or terrace structures 3, thereby pushing the terrace structures 3 from the front end to the rear end of each of the first and second transport conveyors 1, 2.

The first transport conveyor 1 and the second transport conveyor 2 may each include a base. The base may include a plurality of vertical pipe supports 36 that support a pair of roller tracks 9. Connector brackets 11 may secure the vertical pipes supports 36 together. The transport track 10 and the gutter 32 may be supported by the connector brackets 11. As illustrated in FIGS. 2B and 2C, the connector brackets 11 may be in the form of trellises 17 and I-beams 18, such as steel I-beams, support by metal posts 17A. In such embodiments, the connector brackets 11 may support multilevel structures. In certain embodiments, the vertical pipe supports 36 on the first and/or second sides may include a threaded telescopic piping 33. Therefore, the length of the vertical pipe supports 36 may be adjusted, which adjusts an overall angle of the first and second transport conveyor 1, 2. In such embodiments, the first and second transport conveyor 2 may be offset at an angle to allow the unused water to drain from the terrace structures 3 into the gutter 32 and from the gutter 32 into the closed loop irrigation system.

In certain embodiments, the bottom of the table 20 or terrace structures 3 may include rollers 34. Therefore, the clackers 10a may push the terrace structures along the first and second conveyors 1, 2 and the rollers 34 may roll along the pair of roller tracks 9. In certain embodiments, the rollers 34 may include guide rollers 34a and flat rollers 34b. The guide rollers 34a may include protruding guide brackets surrounding a wheel that ensures that the terrace structures 3 stay on the pair of parallel roller tracks 9 as they are transported down the first and second conveyors 1, 2. The flat rollers 34b allow the terrace structures 3 to adjust to minor variances between the roller tracks 9.

As mentioned above, the present invention is a closed loop system 100. In certain embodiments, the first transport conveyor 1 and second transport conveyor 2 are parallel to one another and convey in opposing directions. The first transport conveyor 1 transports the terrace structure 3 to the first transfer conveyor 23 via a loading conveyor 6. The terrace structure 3 is then transferred to another loading conveyor 6 which transports the terrace structure 3 to the second transport conveyor 2. In certain embodiments, the present invention may include a second transfer conveyor 23 that transfers the terrace structure 3 from the rear end of the second transport conveyor 2 to the front end of the first transport conveyor 1. In such embodiments, a loading conveyor 6 of the second transport conveyor 2 may transfers the terrace structure 3 to the second transfer conveyor 23, the second transfer conveyor 23 transfers the terrace structure 3 to a loading conveyor 6 of the first transfer conveyor 23, and the loading conveyor 6 transports the terrace structure 3 to the front end of the first transport conveyor 1.

Figure 6:
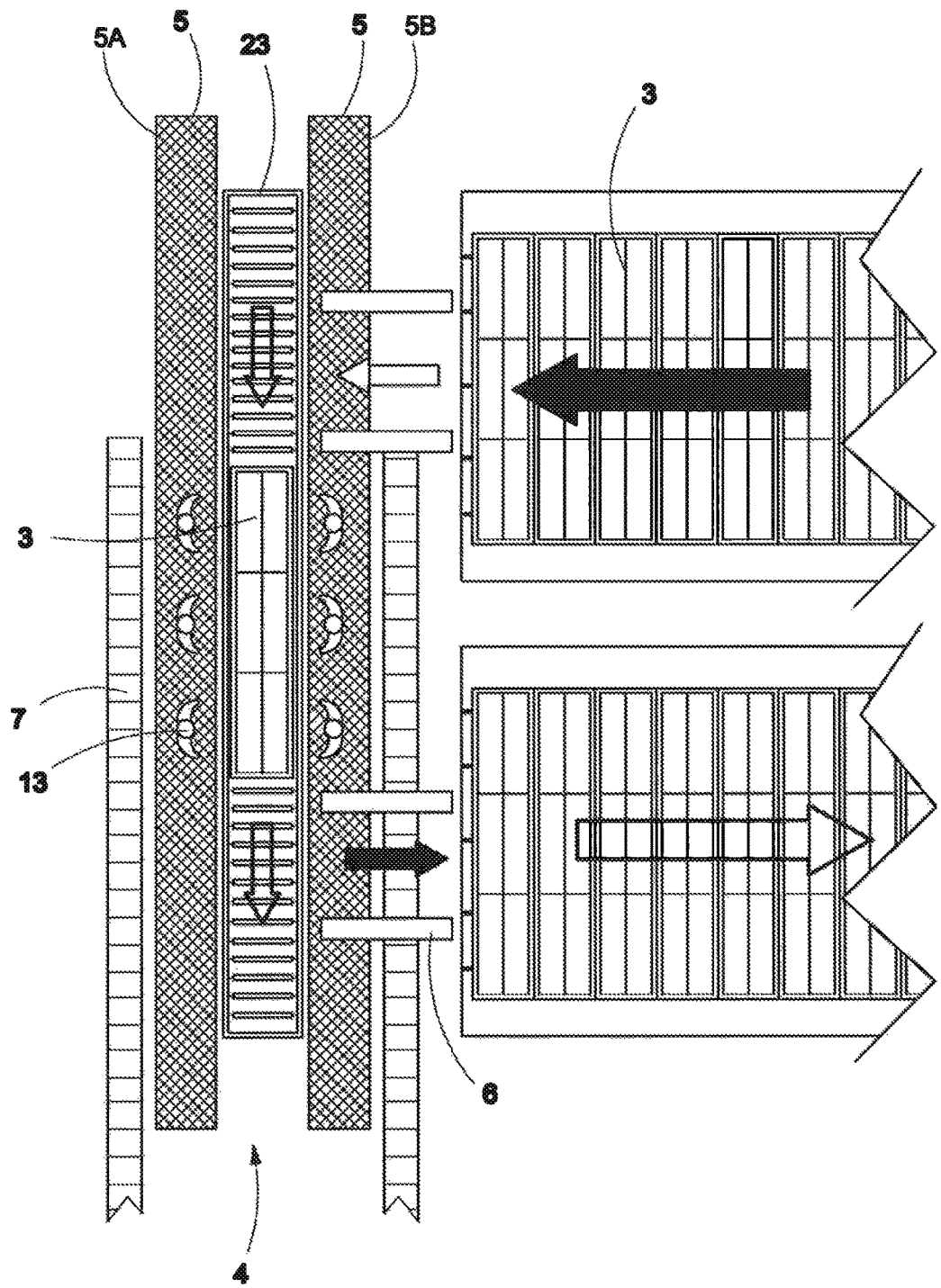
FIG. 6 is a section detail view of a docking system of FIG. 1.
Figure 9:
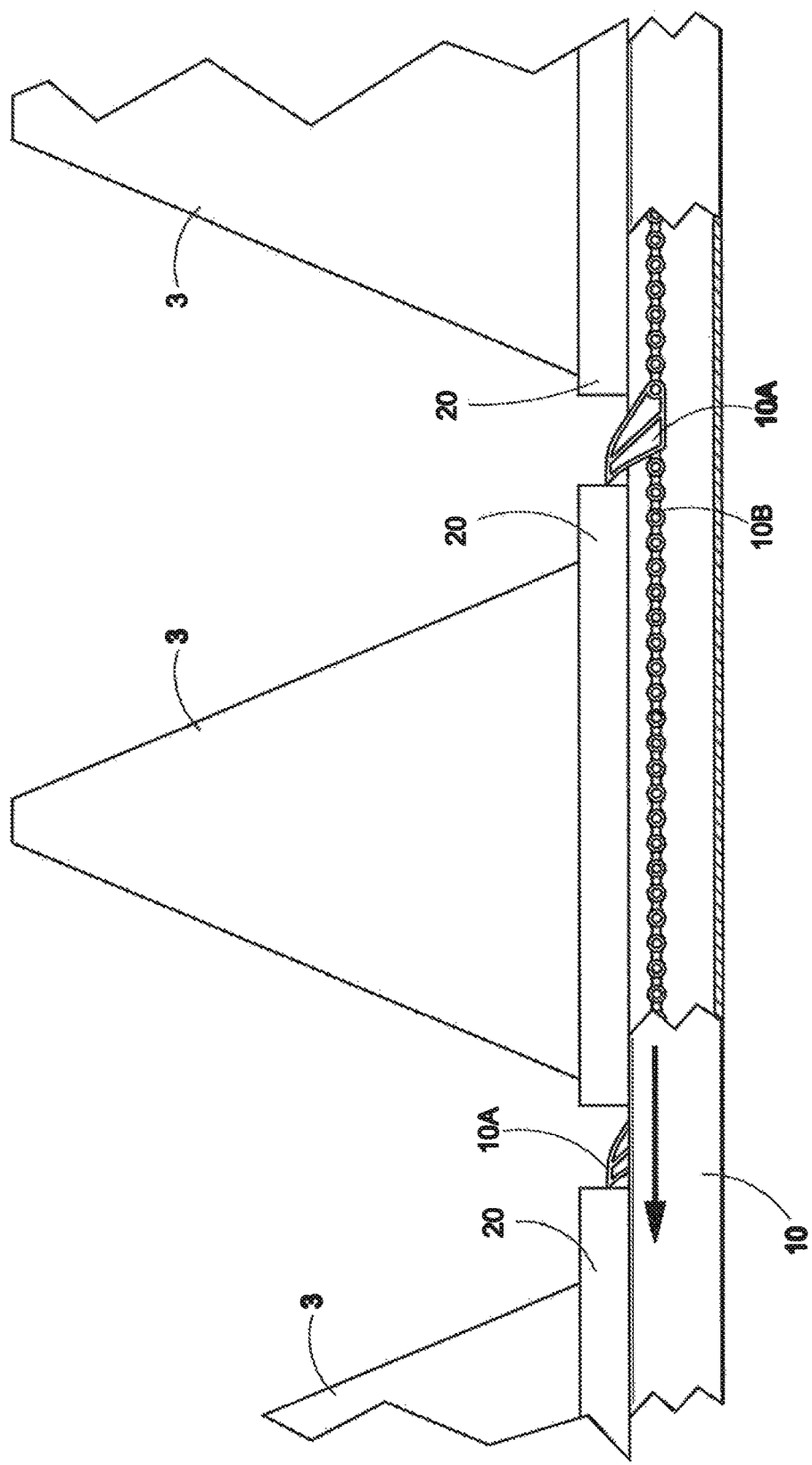
FIG. 9 is a cutaway view of an embodiment of a transport track illustrating a chain and a clacker of the present invention.

As illustrated in FIGS. 1 and 6, the present invention may further include docking stations 4. In certain embodiments, the docking stations 4 may be located at the first and second transfer conveyors 23. A standing platform 5 is adjacent to the transfer conveyor 23 and a plant conveyor 7 is adjacent to the platform 5. In certain embodiments, a standing platform 5 may be on either side of the first and second transfer conveyors 23, each standing platform 5 having access to a plant conveyor 7. The plant conveyor 7 may run to a remote location.

While the terrace structures 3 are located on the first and second transfer conveyors 23, the terrace structures 3 may automatically stop between the two standing platforms 5 at the docking station 4. This allows the workers 13 to access the growing panels 8 on each side of the terrace structures 3. The workers 13 may be either people or robots. Each worker 13 picks or plants and/or services the growing panels 8 on one side of each of the terrace structures 3. This may further include injecting water into the enclosed space 24 while the terrace structure 3 is in the docking station 4. When the growing panel 8 has been harvested, re-planted or serviced, the transfer conveyors 23 moves the terrace structure 3 to the loading conveyor 6, which then loads the terrace structure 3 on one of the first and second transport conveyors 1, 2. The above procedure is taken place at both the front end and rear end of each of the first and second transport conveyors 1, 2. Thus, two terrace structures 3 may be in a docking station 4 being harvested, replanted or serviced at one time. This process of bringing the terrace structures 3 to a docking station 4 eliminates the need for walkways and may reduce the overall square footage foot print required in the building from about 40% to 50% as well as substantially reducing labor time which significantly lowers operating costs.

The standing platform 5 may include a left platform 5a and a right platform 5b. In certain embodiments, the loading conveyor 6 delivers the terrace structure 3 directly to the left platform 5a of the docking station 6. This procedure may take place when the workers 13 on the right platform 5b temporarily crossover to the left platform 5a while the terrace structure 3 is being transferred from the first transport conveyor 1 to the left platform 5a. Once the terrace structure 3 is docked against the docking station 4 left platform 5a and is now ready for harvesting, planting or servicing and the workers 13 may safely return to the right platform 5b. The purpose of this type of docking station 4 procedure may occur when the distance between the building 45 column beams is limited.

As mentioned above, the docking station 4 may further include motorized conveyor belts 7 for each standing platform 5. The motorized conveyors 7 may transport the harvested vegetation containers from the standing platforms 5 to the coolers and simultaneously transport new, empty vegetation containers back to the platforms 5 of the docking station 4. When the terrace gardens 3 are being serviced, the motorized conveyor belt 7 may also transport containers with the old plants and debris from the catch pan 21 to the waste disposal bin while simultaneously transporting back to the docking station 4 platforms 5 empty containers or containers with new plants to be re-planted on the terrace structures 3.

In certain embodiments, the transport conveyors 1, 2 may transport an odd number of terrace structures 3 from the front end to the rear end. Each day one third of the terrace structures 3 are harvested at both docking stations 4. Therefore, each terrace structure 3 may be harvested every three days.

As illustrated in FIG. 7A, the closed loop growing system may include more than two transport conveyors 1, 2, such as a third transport conveyor 2a or more. The transport conveyors 1, 2, 2a may be side by side, i.e. substantially parallel to one another, and may transport terrace structures 3 in the same direction. The terrace structures 3 are loaded onto the system at the docking stations 4 and are loaded onto the transport conveyors 1, 2, 2a at a first end 39 by a third transfer conveyor 23c. The transport conveyors 1, 2, 2a transport the terrace structures 3 from the first end 39 to a second end 40 and onto the first transfer conveyor 23a. The terrace structures 3 are then delivered to one of a plurality of second transfer conveyors 23b. Each of the second transfer conveyors 23b may include a remote docking station 4 to simultaneously plant, harvest or service the terrace structures 3. When the planting, harvesting or servicing of the terrace structure 3 is completed, the second transfer conveyors 23b then transfer the terrace gardens 3 back to the third transfer conveyor 23c, which delivers the terrace structures 3 back to the first end 39 of the transport conveyors 1, 2, 2a and thus forming the closed loop system 100. If the present invention includes multiple levels of transport conveyors 1, 2, 2a stacked vertically relative to one another, the loading conveyor 6 may be replaced with a lift 60, as illustrated in FIG. 7B.

It should be understood, of course, that the foregoing relates to exemplary embodiments of the invention and that modifications may be made without departing from the spirit and scope of the invention as set forth in the following claims.

What is claimed is:

1. A mobile terrace growing system comprising:
    a first transport conveyor comprising a front end and a rear end;
    a second transport conveyor comprising a front end and a rear end;
    a first transfer conveyor;
    a lighting system positioned to emit light towards the first transport conveyor and the second transport conveyor; and
    at least one terrace structure comprising:
        a bottom portion configured to support the terrace structure in an upright position; and
        at least one growing panel extending from the bottom portion and disposed at an angle inward relative to the bottom portion and comprising an outer surface and an inner surface, wherein the outer surface comprises a plurality of adjoining and alternating risers and terrace levels to form a stair structure disposed along the angle, wherein a plurality of openings are formed through the terrace levels, a plurality of convex protrusions are disposed along each of the terrace levels on the inner surface in between the plurality of openings, and a substantially enclosed space is formed within the terrace structure, wherein the first transport conveyor transports the at least one terrace structure from the front end to the rear end, the first transfer conveyor transfers the at least one terrace structure from the rear end of the first transport conveyor to the front end of the second transport conveyor, and the second transport conveyor transports the at least one terrace structure from the front end to the rear end.

2. The system of claim 1, further comprising a second transfer conveyor, wherein the second transfer conveyor transfers the at least one terrace structure from the rear end of the second transport conveyor to the front end of the first transport conveyor.

3. The system of claim 1, further comprising an air and water delivery system operable to deliver air and water to the at least one terrace structure.

4. The system of claim 3, wherein the air and water delivery system comprises an extendable air injection arm and an extendable water injection arm disposed alongside or under at least one of the first transport conveyor and the second transport conveyor, wherein the terrace structure comprises a water inlet and an air inlet leading into the enclosed space.

5. The system of claim 4, further comprising a mister system disposed within the substantially enclosed space and connected to the water inlet.

6. The system of claim 1, wherein the at least one terrace structure comprises a first growing panel and a second growing panel extending from opposing sides of the bottom portion and angled towards one another, forming a triangle shaped structure.

7. The system of claim 6, wherein the at least one terrace structure comprises a first end panel and a second end panel extending from the bottom portion on opposing sides and adjoining the first growing panel and the second growing panel together.

8. The system of claim 1, wherein the bottom portion comprises a catch pan comprising a drain, wherein the catch pan tapers towards the drain forming a funnel, wherein the drain directs liquid to a water recovery gutter of each of the first and second transport conveyors.

9. The system of claim 1, further comprising a chimney disposed at a top end of the terrace structure providing an air exchange exhaust from the enclosed space.

10. The system of claim 1, wherein the plurality of convex protrusions forms a plurality of concave recesses on the outer surface.

11. The system of claim 1, wherein the lighting system comprises a hoist operable to lower and raise the lighting system.

12. The system of claim 1, wherein the first transport conveyor and the second transport conveyor each comprise:

at least one transport track comprising an upper channel running from the front end to the rear end;

a chain running within the transfer track;

an actuator operable to move the chain along the at least one transfer track; and at least one clacker attached to the chain and protruding beyond the upper channel, wherein the actuator drives the chain and the clacker catches the at least one terrace structure, thereby pushing the terrace structure from the front end to the rear end.

13. The system of claim 12, wherein the first transport conveyor and the second transport conveyor each comprise a base comprising a plurality of vertical supports supporting a pair of roller tracks.

14. The system of claim 13, wherein the at least one terrace structure comprises a plurality of rollers that run along the pair of roller tracks.

15. The system of claim 13, wherein at least a portion of the plurality of vertical supports comprise an adjustable height.

16. The system of claim 1, further comprising at least one table comprising a protruding sidewall, wherein the at least one terrace structure is supported on the table.

17. The system of claim 16, wherein the at least one table is sized to fit a plurality of the terrace structures within.

18. The system of claim 17, wherein the at least one table comprises a plurality of tables, wherein each of the plurality of tables supports a plurality of the terrace structures.

19. The system of claim 1, further comprising a docking station comprising a standing platform adjacent to the transfer conveyor and a plant conveyor adjacent to the platform, wherein the plant conveyor runs to a remote location.

* * * * *